United States Patent [19]

Gellatly et al.

[11] 4,229,155

[45] Oct. 21, 1980

[54] APPARATUS FOR BONDING A PLASTIC CASE TO A STUB CABLE

[75] Inventors: John S Gellatly, La Grange; Fred T. Richter, La Grange Park, both of Ill.

[73] Assignee: Western Electric Company, Inc., New York, N.Y.

[21] Appl. No.: 72,393

[22] Filed: Sep. 4, 1979

[51] Int. Cl.³ ............................................. B29C 27/10
[52] U.S. Cl. ................................. 425/114; 156/497; 156/500; 156/539; 425/115; 425/125
[58] Field of Search ............... 156/69, 294, 497, 500, 156/423, 539; 264/263; 425/110, 113, 114, 115, 125; 118/320

[56] References Cited

U.S. PATENT DOCUMENTS

| | | | |
|---|---|---|---|
| 2,319,683 | 5/1943 | Hofmann | 156/539 |
| 2,710,986 | 6/1955 | Gray | 156/500 |
| 2,976,200 | 3/1961 | Stover | 156/500 |
| 3,090,772 | 5/1963 | Crowell | 264/263 |
| 3,191,223 | 6/1965 | Quinche et al. | 156/497 |
| 3,324,625 | 6/1967 | Dulmage | 156/497 |
| 3,456,564 | 7/1969 | McCandless | 156/69 |
| 4,074,619 | 2/1978 | Feliks | 156/69 |

Primary Examiner—Jerome W. Massie
Attorney, Agent, or Firm—R. P. Miller

[57] ABSTRACT

A coiled section (16) of a plastic sheathed stub cable (10) is placed on a support (43) which is orbited about a longitudinal axis of a straight section (13) of the stub cable. The straight section of cable is positioned coaxially within an aperture formed in a casing part (12) which is mounted in a rotating nest (16). The juncture (70) between the apertured casing and the cable sheath is heated (81), whereafter a bead (91) of bonding material is extruded around the juncture. A molding die (106) is moved onto the extruded bead to force portions of the bead into the juncture to form a homogeneous weld with the cable sheath and casing parts while uniformly shaping the remaining portions.

6 Claims, 6 Drawing Figures

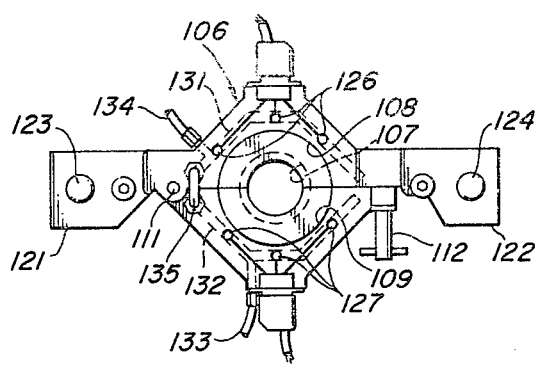
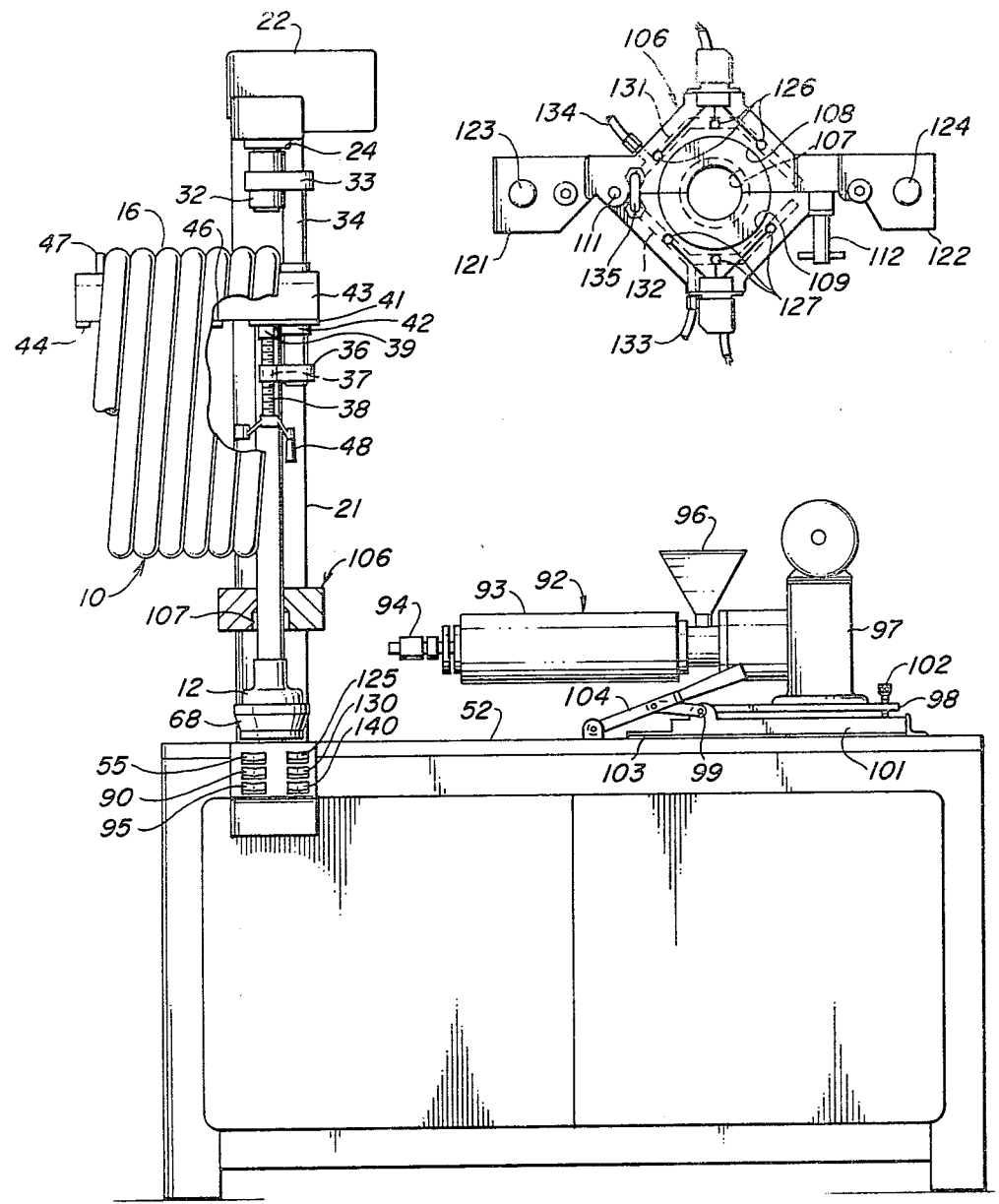

APPARATUS FOR BONDING A PLASTIC CASE TO A STUB CABLE

FIELD OF THE INVENTION

This invention relates to a method and apparatus for bonding a plastic case to a plastic sheathed stub cable, and more particularly to orbiting a coiled section of cable about a straight section of the cable while bonding an apertured casing cap to the end of a plastic sheath jacketing the cable.

BACKGROUND OF THE INVENTION

Loading coils find wide-spread use in the telephone industry wherein the coils are connected in series with individual telephone wires to balance detrimental effects of capacitance between wire pairs and, thus, improve signal transmission characteristics. The failure to balance the capacitance effect results in attenuation and distortion of telephone conversations. Traditionally, arrays of loading coils have been packaged in steel or other metallic casings. In copending application Ser. No. 864,304, filed Dec. 27, 1977, now U.S. Pat. No. 4,172,965, in the names of J. D. Eyestone and M. E. Szymanski, there is shown a packaged loading coil assembly that is encased in a plastic housing. Plastic housings of this type are made up of a number of component sections which must be bonded together and bonded to a stub cable containing wire pairs that are connected to the telephone communication wires.

The present invention is particularly concerned with facilities for bonding a plastic component of a loading coil housing to the plastic sheath that jackets a stub cable that also has a coiled section. It is known that plastic parts of various types of housings may be bonded together by extruding a bonding plastic bead along a juncture of the parts. In other situations, thermoplastic parts of a container have been joined by heating and applying pressure to a juncture between the parts. In U.S. Pat. No. 2,319,683 there is shown an apparatus for joining two sections of a bottle-like thermoplastic container. More particularly, the patent discloses apparatus for rotating the parts of the container while applying heat and pressure to a juncture between the parts so as to soften and fuse a bead on one part to the other part.

SUMMARY OF THE INVENTION

This invention comtemplates, among other things, the bonding of one plastic article to another wherein a first of the articles has an elongated section and an offset section, and the second article has an aperture therein to receive the elongated section. Facilities are provided for orbiting the offset section about the longitudinal axis of the elongated section, and at the same time rotating the second article about the longitudinal axis while bonding material is applied to a juncture between two rotating portions of the respective articles.

More particularly, the invention contemplates joining a straight section of a stub plastic sheathed cable to an apertured plastic cap which forms part of a housing for mounting a group of loading coils. In order to facilitate handling the stub cable, a substantial portion is wound into a coil that is offset to the straight section. The apertured cap is fitted over a plastic jacket on the straight section of the cable and then loaded into a nest mounted for rotation.

The coiled section of the cable is mounted on a support which is laterally offset from the longitudinal axis of the straight section of the cable. The coiled section of the cable is orbited about the longitudinal axis of the straight section of the cable, and at the same time the nest supported casing cap is rotated with the now rotating straight section of the stub cable. A plastic bonding material is extruded as a bead along the juncture of the rotating cap and straight section of the cable. Following the extrusion of the thermoplastic bead, an auxiliary molding device is moved onto the extruded bead to force the bead into the juncture and shape it into a uniform weldment with the cable sheath and a casing cap.

BRIEF DESCRIPTION OF THE DRAWING

Other features and advantages of the present invention will be apparent upon consideration of the detailed specification and the drawing, wherein

FIG. 2 is a top view taken along line 2—2 of FIG. 1 showing the construction of a device for shaping a weldment joining the stub cable to the casing part;

FIG. 3 is a front elevational view of the apparatus together with a showing of an extruder for applying a welding bead to the juncture of the casing part and the sheath of the stub cable;

DETAILED DESCRIPTION

Figure 1:
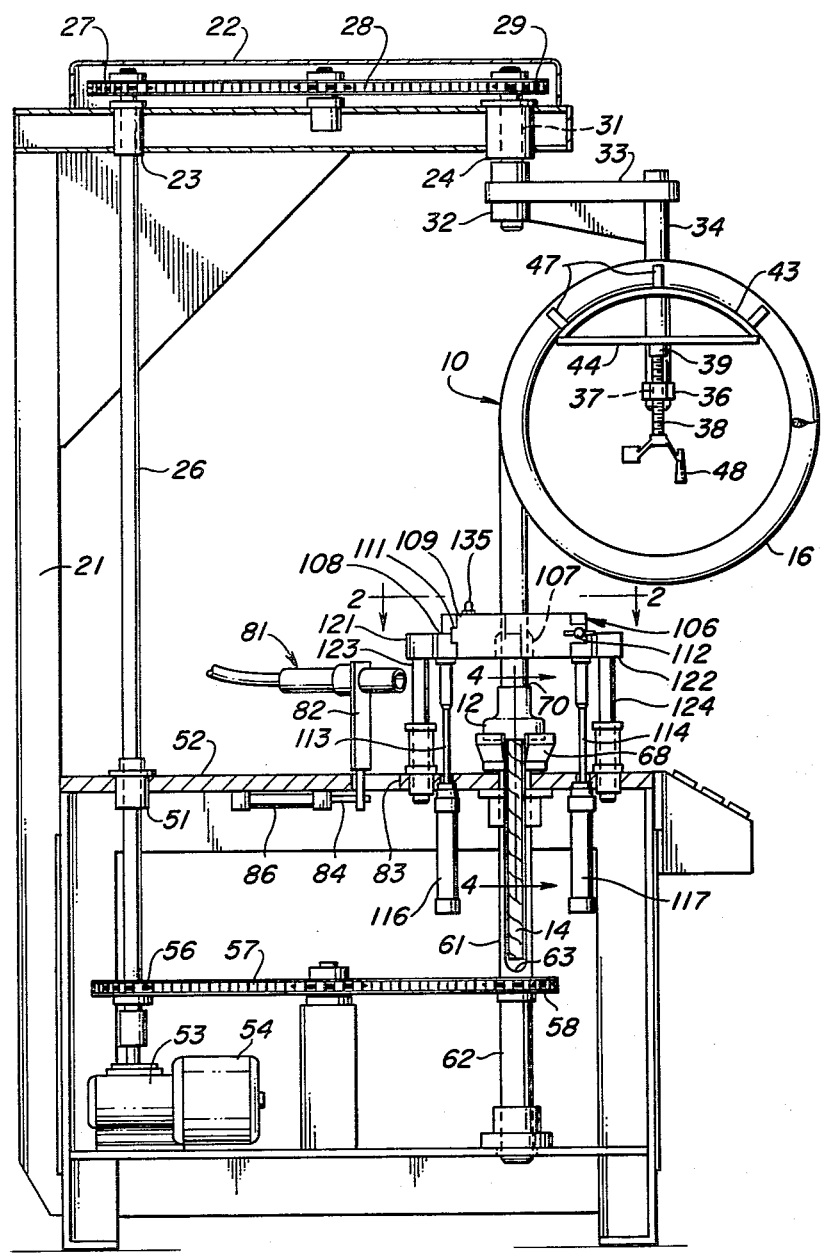
FIG. 1 is a side elevational view, partially in section, of an apparatus for welding a plastic sheath on a stub cable to a plastic part of a casing, utilizing the principles of the present invention.
Figure 4:
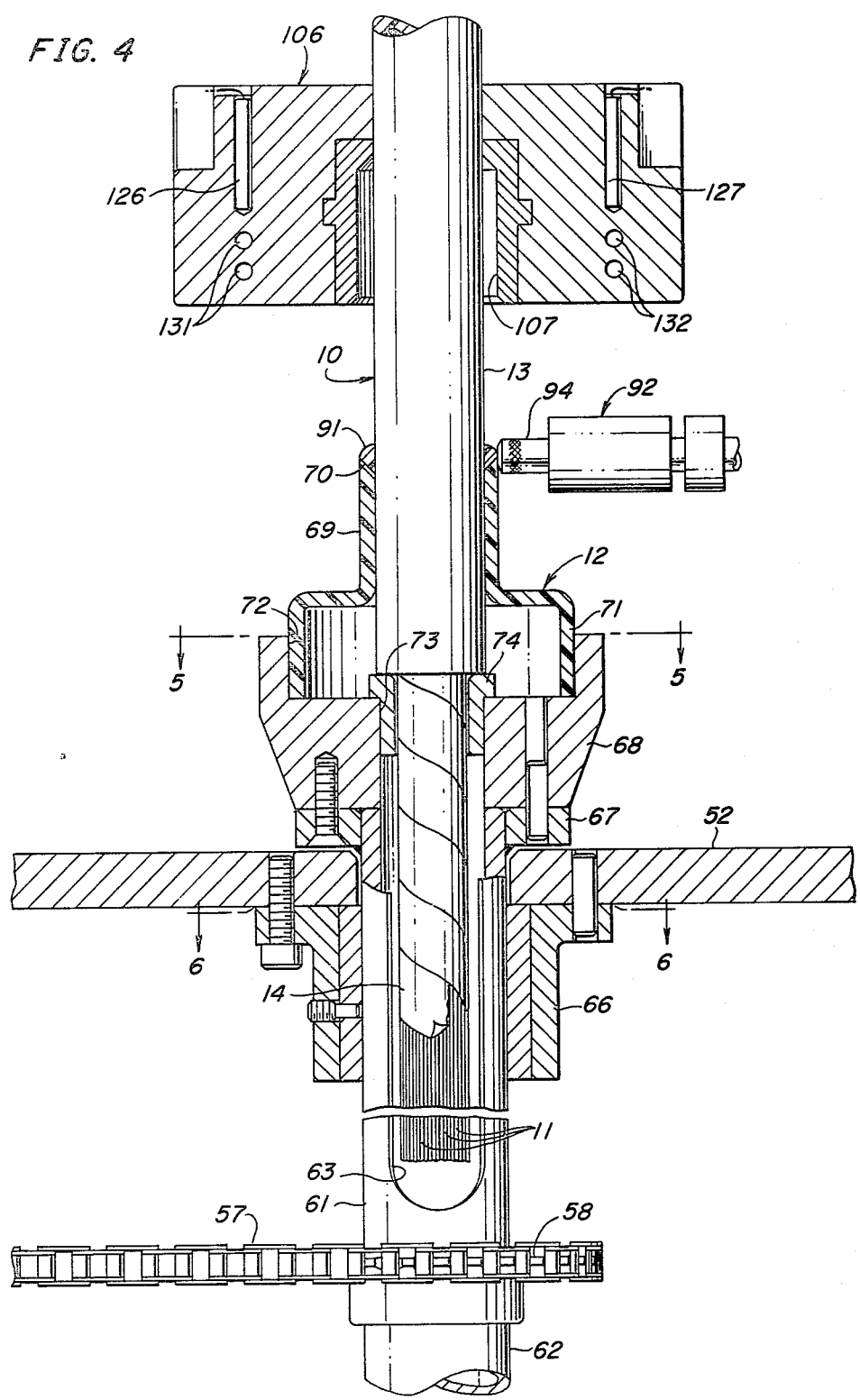
FIG. 4 is a sectional view taken along line 4—4 of FIG. 1 showing the details of construction of a nest for supporting the casing part during the laying down of a bead to join the part to the cable sheath.

As best seen in FIGS. 1, 3 and 4, there is shown a stub cable 10 made up of bundles of insulated wires 11 that are utilized to interconnect arrays of individual loading coils with telephone transmission wire paths. The individual loading coils may be stacked and mounted in a plastic casing or housing of the type shown in the aforeidentified copending application of Eyestone and Szymanski. A part of this casing may be formed of low density polyethylene in the shape of an apertured necked part or cap 12 that is bonded to a straight section 13 of the stub cable 10.

A cable 10 of this type may be constructed of bundled groups of pairs of polyethylene insulated wires which are wrapped and held in place by overlaying spirals of paper. The paper-wrapped bundles of wire may be overlayed with tubular shields of aluminum and steel, and finally the shields are jacketed with a low density polyethylene sheath.

In preparation for the attachment of the wires to the loading coils and the assembly of the loading coils in a plastic housing, a section 14 of the cable is stripped of the metal shields and the polyethylene sheath, and a major section of the cable is wound into a coiled section 16 to facilitate handling during various assembly operations. The method and apparatus of the present invention is concerned with bonding or welding the apertured casing cap 12 to the end of the polyethylene sheath on the straight section 13 of the cable.

The facilities for supporting the stub cable and the necked cap during a welding operation include a frame 21 having a boom-like housing 22 that supports a pair of bearings 23 and 24. Mounted in bearing 23 is a drive shaft 26 which is attached to a driving sprocket 27 for a chain 28. Movement of the chain 28 is imparted to a driven sprocket 29 attached to a shaft 31 extending through bearing 24. The lower portion of the shaft 31 is attached to a collar 32 that is secured to a bracket 33 providing a mounting for a depending rod 34.

Secured to the lower portion of the rod 34 is a bar-like member 36 having a threaded aperture 37 formed therein to receive a screw 38. The upper end of the screw 38 is fitted with a collar 39 that bears against and supports a plate 41 (see FIG. 3). The plate 41 is secured to a sleeve 42 that is slidably mounted on the rod 34. An arcuate band 43 having cross braces 44 and 46 is secured at opposite edges thereof to the plate 41. The band 43 is slotted to receive adjustable stop members 47 which bear against the outer convolution of the coiled section 16 of the stub cable.

When the coiled section 16 is placed on the band 43, a handle 48 may be turned to move the screw 38 to raise or lower the band 43 to thus accurately position the end of the sheath portion of the straight section 13 relative to the casing part 12. When rotation is imparted to the shaft 26, the arm 33 is rotated to orbit the coiled section 16 of the cable about the longitudinal axis of the straight section 13 of the cable. The shaft 26 extends through a bushing 51 mounted in a table 52 forming a part of the overall frame for the apparatus. The lower end of the shaft 26 is coupled to a commercial gear reduction mechanism 53 that is driven by a motor 54 controlled by a push button switch control 55.

Each of the push button switch controls, such as switch control 55, includes a pair of push buttons for selectively exercising through suitable electrical or pneumatic circuitry (1) an "on" or "forward" operation for the various devices to be controlled, such as the motor, heaters, extruder and air cylinders and (2) an "off" or "reverse" operation for the controlled devices.

Rotation of the shaft 26 is also imparted by a sprocket 56 to a chain 57 that drives a sprocket 58 which is secured to a sleeve or tube 61. The sleeve 61 (see FIG. 4) is fitted over the end of a stationary guide shaft 62. The sleeve 61 is provided with a slot 63 to receive the desheathed section 14 of the cable 10. The sleeve 61 is rotatably mounted in a bearing 66 attached to the underside of the table 52. The upper portion of the sleeve is attached by means of a ring member 67 to the underside of a nest 68 which is recessed to receive the plastic casing part 12.

As shown in FIG. 4, the part 12 includes an apertured neck section 69 that is to be secured along a juncture 70 to the sheath on the straight section 13 of the cable. The part also includes a flange section 71 which is fitted within a recess 72 formed in the nest 68. The nest is provided with a central bore 73 into which is placed a flanged gauging collar 74. The flanged portion of the collar 74 abuts the end of the plastic sheath on the cable and, thus, positions the sheath within the neck portion 69 of the casing part 12. The inner diameter of the gauging collar is selected to accommodate the diameter of the bundles of wires 11. When a different size cable is to be connected to a casing part, then a different size gauging collar 74 is utilized.

Briefly recapitulating, it will be appreciated that the motor 54 through the chain 57 will rotate the nest 68 and, hence, the casing part 12 about the longitudinal axis of the straight section 13 of the cable. The motor 54 is effective through shaft 26 to rotate bracket 33 so as to orbit the coiled section 16 of the cable about the longitudinal axis of the straight section. This orbiting movement also imparts rotation to the straight section 13 so that this section rotates in unison with the rotation imparted to the casing part 12.

Figure 5:
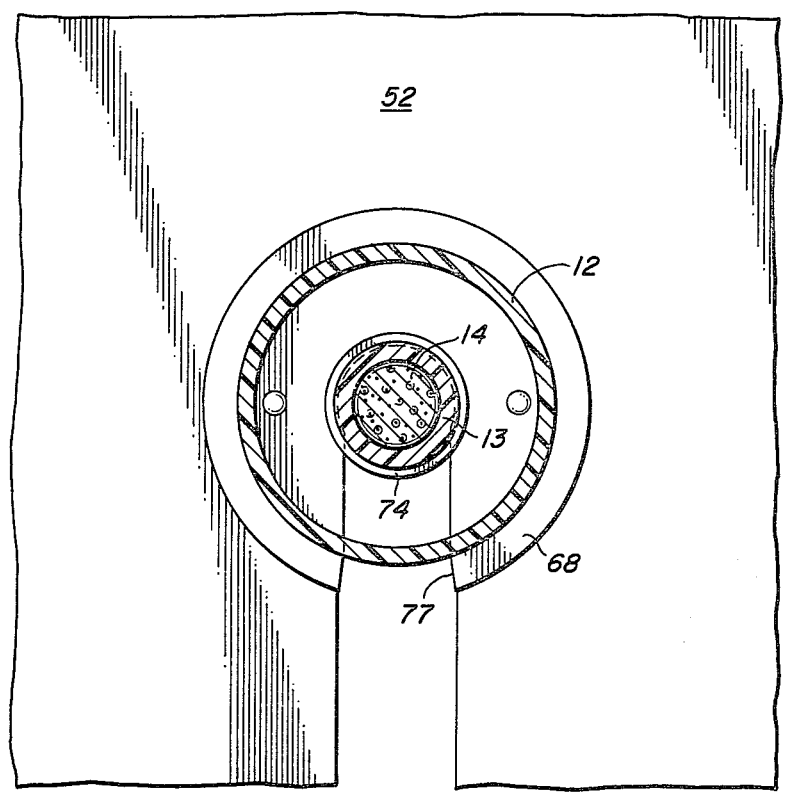
FIG. 5 is a sectional view taken along line 5—5 of FIG. 4 showing the nest and an entry for loading a section of the stub cable in the nest.
Figure 6:
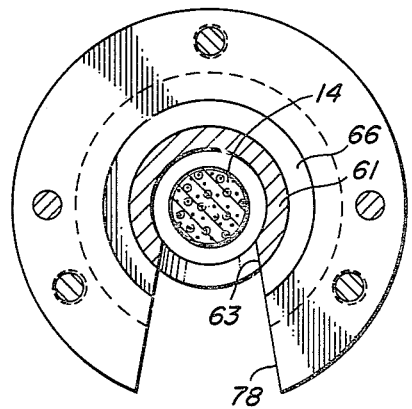
FIG. 6 is a cross-sectional view taken along line 6—6 of FIG. 4 showing a slotted construction of a tube for receiving a section of the stub cable during a welding operation.

Referring to FIGS. 1, 5 and 6, it will be noted that the sleeve 61 is provided with an elongated slot 63 so that the desheathed section 14 of the cable may be positioned within the sleeve. The nest 68 is also provided with a slot 77 to receive the desheathed section of the cable. In a like manner, the bearing 66 is provided with a slot 78 for the same reason. However, the gauging collar 74 is not slotted and must be slid over the stripped end section 14 of the cable prior to the positioning of the stripped cable section in the slotted tube and slotted nest.

Prior to bonding the casing part 12 to the straight section 13 of the cable, the juncture between the top of the casing part 12 and the cable should be preheated. To accomplish such a preheating, there is mounted on the table 52 an air heater 81 (see FIG. 1). The air heater 81 is secured to a support bracket 82 having an extension extending through a slot 83 formed in the table 52. The lower end of the support bracket is secured to a piston rod 84 extending from an air cylinder 86 connected in a suitable air system controlled by a push button switch control 90. Upon operation of air cylinder 86, the piston rod 84 will be extended to move the air heater into close proximity to the juncture 70. As the casing part 12 and the straight section of the cable is rotated, the juncture will be uniformly heated.

Following the heating of the juncture 70, a bead 91 is extruded at the juncture. The extrusion is accomplished by an extruder 91 (see FIG. 2) having an extrusion chamber 93 and a nozzle 94. An extruder of this type is commercially available and may be of the type sold as Killion Extruder KLB-975 by Killion Extruders Inc. of 56 Depot St., Verona, New Jersey. The extruder is controlled by a push button switch control 95. A hopper 96 is provided to receive a suitable welding compound, such as low density polyethylene. A motor 97 is provided to operate the extruder, and this motor is mounted on a platform 98 pivotally mounted by a pin 99 to a slide 101. The position of the platform 98 may be adjusted by turning an adjusting bolt 102 so as to tilt the extruder and, thus, raise or lower the level of the nozzle 94. The slide 101 is mounted on a trackway 103. A pivotally mounted handle 104 is provided to move the slide 101 and, hence, the extruder 92 to position the nozzle in close proximity to the juncture 70 (see FIG. 4). When the nozzle 94 is moved adjacent the juncture 70, a suitable control circuit is operated by depression of the push button control 95 to cause the extruder 92 to apply extrudant through the nozzle to the rotating juncture 70.

After the bead 91 is laid in the juncture, the heater 81 and the extruder 92 are withdrawn and the bead is forced into the juncture and molded into a final shape by a die assembly 106 having a shaping cavity 107. The die assembly 106 (see FIGS. 1 and 2) is split in two sections 108 and 109 joined by a hinge 111. The die sections are held together by a latch 112. Die section 108 is mounted on a pair of piston rods 113 and 114 extending respectively from air cylinders 116 and 117. Die section 108 is provided with extensions 121 and 122 that are apertured to receive guide posts 123 and 124.

The air cylinders 116 and 117 are operated by opening a suitable push button 125 controlled valve to regulate the application of air to the cylinders, whereupon the piston rods 113 and 114 are brought down to move the die 106 toward the nest 68. The shaping chamber 107 formed by the dies in the die blocks 108 and 109 is moved over the necked portion 69 of the casing cap 12 so as to act on and shape the extruded bead 91. The shaping die assembly 106 is made in two sections so that the die section 109 may be moved on hinge 111 to allow for the initial loading of the stub cable 10.

In order to further control the shape and setting of the plastic extruded bead, the shaping die assembly may be provided with cartridge heater units 126 and 127 (see FIG. 2) inserted and wired in each of the respective die supports. These heater units are usually in an "on state" and are selectively shut off by operation of a push button switch control 130 after the shaping dies are moved downwardly to shape the bead.

Further, the setting of the extruded plastic bead may be hastened by a cooling system in the die support. This cooling system may include fluid passageways or conduits 131 and 132 running through the die support sections 108 and 109 to an input hose 133 and an outlet hose 134 running to a source of pressurized cooling fluid (not shown). The cooling fluid conduits in the respective die support sections 108 and 109 are interconnected by a flexible bridging hose 135. The flow of the coolant is initiated after the shaping dies are in the down position by actuation of a push button switch control 140 controlling a solenoid operated valve in the cooling system or a manual control switch for an electrical pump that functions to pressurize and flow the coolant fluid.

In use of the apparatus and practice of the method, an attending operator will strip the overlying metal shields and plastic jacket from an end section of a stub cable 10. Next, the casing part 12 and the gauging collar 74 are slipped over the end of the cable to rest near the end of the sheathed portion of the cable. The die section 109 is opened and the assembled casing part, gauging collar and stub cable are placed in the apparatus with the coiled section 16 resting on the arcuate support band 43. The desheathed section of the cable is moved through the slot 63 in the tube 61 and the slot 77 in the nest 68. The end of the plastic sheath on straight section 13 of the stub cable is abutted against the gauging collar 74. The casing part 12 is pushed into the nest cavity so that the lower rim rests on the floor of the nest. The attending operator will then depress push button switch control 55 to operate the motor 54 to orbit the offset coiled section 16 of the cable about the longitudinal axis of the straight section of the cable. The air cylinder 86 is then operated by depression of push button control 90 to move the heater 81 into proximity of the juncture 70. The juncture between the cable sheath and the casing part is thus preheated. The heater is withdrawn, or it may be maintained in position, and then the operator moves the handle 104 to position the nozzle 94 in close proximity to the juncture 70. The extruder is operated by depression of push button control 95 to lay a bead of extrudant 91 along the rotating juncture 70.

Next, the extruder is withdrawn and the shaping die assembly 106 is moved downwardly by operating the push button switch control 125 to apply air to the air cylinders 116 and 117. When the die assembly 106 is moved down the cartridge heaters 126 and 127 are effective to heat the dies so the engaged extruded plastic is not cooled but is retained in a plastic state and is readily deformed. The push button switch control 130 is depressed to interrupt the circuit for energizing the cartridge heater units 126 and 127, and then the push button switch control 140 is actuated to flow the coolant through the conduits 131 and 132 to hasten the setting of the plastic weldment. Following setting of the plastic weldment, air cylinder 116 and 117 are restored to the up position and the latch 112 opened to permit the attending operator to pivot die support section 109 away from section 108, thus allowing the operator to remove the stub cable 10 with the casing part 12 welded to the cable sheath 13. The heated die cavity 107 is effective to force portions of the bead into the juncture and to mold the remaining extrudant 91 into a uniform shape causing a homogeneous bond between the cable sheath, extrudant and casing cap.

What is claimed is:

1. An apparatus for bonding an apertured member to an elongated section extending in an offset relation to the center of an article, which comprises:

a frame having a slot extending therein;

a tube for receiving the elongated section of the article;

a nest mounted on the tube for supporting the member with the elongated section projecting through the apertured member into the tube;

means for rotatably mounting the tube to extend through said slot in said frame;

a boom extending from said frame to overlie the tube and the nest;

an arm rotatably mounted on the boom with its axis of rotation aligned with the axis of the tube;

means depending from the arm for supporting the article with the elongated section projecting in said tube and the center of the article offset from the axes of the tube and the rotatably mounted arm;

means simultaneously rotating the tube and guide about the axis of the tube while orbiting the article about the axis of the tube; and means for applying bonding material to the juncture of the rotating apertured member and the elongated section of the article.

2. An apparatus for bonding a straight section of a plastic sheathed, stub cable to a plastic casing part having an aperture formed therein, the cable also having an offset coiled section, which comprises:

a nest for receiving the plastic part;

means for supporting the coiled section of the cable in offset relation to the longitudinal axis of the straight section while the straight section is positioned within the aperture of the casing part;

means for rotating said supporting means about the center of the apertured nest to orbit the coiled section about the longitudinal axis of the straight section of cable;

means for simultaneously rotating the nest to rotate the casing part in unison with the rotating straight section of cable;

means for laying a bead of bonding means along the juncture between the apertured casing part and the straight section of the cable; and means mounted coaxially of the straight section of the cable for movement toward the nest to force the extruded bead into the juncture between the apertured casing and the straight section of the cable.

3. An apparatus as defined in claim 2, which includes:
a heater means for blowing hot air; and
means for mounting the heater for movement toward and away from the nest to heat the juncture between the casing part and the cable sheath.

4. An apparatus, as defined in claim 3, wherein the means for laying the bead of bonding material includes:
a nozzle;
an extruder for forcing bonding material through the nozzle; and
means mounting the extruder for movement toward and away from the nest to position the nozzle adjacent to the juncture.

5. An apparatus, as defined in claim 4, wherein the extruder mounting means includes:
a slide for guiding the extruder to move toward and away from the nest;
a platform pivotally mounted at one end to the slide for supporting the extruder; and
means for adjustably pivoting the platform to move the nozzle up and down relative to the nest and the juncture between the casing part and the cable sheath.

6. An apparatus for bonding a flanged cap having a central aperture to the end of a plastic sheath of a cable having a projecting desheathed section and a coiled section, which comprises:
a frame having a table with a slot extending from one edge thereof;
a tube rotatably mounted to the table about the inner end of said table slot and said tube having a longitudinal slot alignable with said table slot for entry of the desheathed section of the cable;
a boom projecting from said frame to overlie the table;
an arm rotatably mounted at one end to said boom;
means mounted on said arm for supporting the coiled section of the cable with the desheathed section extending into said tube;
a nest secured to the tube for supporting the flanged cap with the central aperture about the sheath at the juncture of sheathed and desheathed sections of the cable;
means for simultaneously rotating the arm to orbit the coiled section of cable about the nest and tube and for rotating the nest and tube; and
an extruder slidably mounted on said table for movement toward and away from said nest, said extruder having a nozzle that is positioned adjacent to the juncture of the flange aperture and the end of the sheath on the cable for extruding bonding material to said juncture of the rotating flange and cable sheath.

* * * * *